(12) United States Patent
McElrath et al.

(10) Patent No.: US 11,069,465 B1
(45) Date of Patent: Jul. 20, 2021

(54) MAGNETIC MOUNTING APPARATUS FOR BREAKAWAY MOUNTING OF HARDWARE TO AN OBJECT

(71) Applicant: The Government of the United States of America, as represented by the Secretary of Homeland Security, Washington, DC (US)

(72) Inventors: Richard L. McElrath, Elizabeth City, NC (US); Mary Shalane Regan, Groton, CT (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/183,064

(22) Filed: Feb. 23, 2021

Related U.S. Application Data (60) Provisional application No. 63/092,319, filed on Oct. 15, 2020.

(51) Int. Cl.
| | |
|---|---|
| *A47G 1/17* | (2006.01) |
| *H01F 7/02* | (2006.01) |
| *F16B 1/00* | (2006.01) |
| *F16B 47/00* | (2006.01) |

(52) U.S. Cl.
CPC ......... *H01F 7/0252* (2013.01); *H01F 7/0231* (2013.01); *H01F 7/0242* (2013.01); *F16B 47/00* (2013.01); *F16B 2001/0035* (2013.01)

(58) Field of Classification Search
CPC .... H01F 7/0252; H01F 7/0231; H01F 7/0242; H01F 7/00; F16B 2001/0035; F16B 47/00
USPC .......................... 248/121, 206.5, 683, 309.4
See application file for complete search history.

(56) References Cited

U.S. PATENT DOCUMENTS

| | | | |
|---|---|---|---|
| 2015/0187480 A1* | 7/2015 | Chaizy ................ | E05B 47/0038 403/66 |
| 2016/0020009 A1* | 1/2016 | Chaizy .................. | H01F 7/0257 335/306 |

* cited by examiner

*Primary Examiner* — Todd M Epps
(74) *Attorney, Agent, or Firm* — Lavanya Ratnam; Kelly G. Hyndman (57) ABSTRACT

In an example, an apparatus for mounting hardware to an object includes: a base member having an attachment surface to be attached to the object, base member magnets, and a base breakaway connection surface; a hardware support having a hardware support surface to receive the hardware, hardware support magnets, and a support breakaway connection surface to be magnetically coupled with the base breakaway connection surface, by magnetic attraction between the base member magnets and the hardware support magnets, to form a magnetic connection having a preset magnetic breakaway strength to maintain the magnetic connection and allow the hardware support and the base member to be separated by a force greater than the preset magnetic breakaway strength; and a fastener to fasten the hardware to the hardware support, the fastener keeping the hardware and the hardware support fastened together under a force sufficiently large to separate the magnetic connection.

20 Claims, 11 Drawing Sheets

MAGNETIC MOUNTING APPARATUS FOR BREAKAWAY MOUNTING OF HARDWARE TO AN OBJECT

CROSS-REFERENCE TO RELATED APPLICATIONS

The application claims the benefit of priority from U.S. Provisional Patent Application No. 63/092,319, filed on Oct. 15, 2020, entitled MAGNETIC MOUNTING APPARATUS FOR BREAKAWAY MOUNTING OF HARDWARE TO AN OBJECT, the disclosure of which is incorporated by reference in its entirety.

SUMMARY STATEMENT OF GOVERNMENT INTEREST

The present invention was made by employees of the United States Department of Homeland Security in the performance of their official duties. The U.S. Government has certain rights in this invention.

FIELD

The discussion below relates generally to systems and methods of breakaway mounting a piece of hardware to an object and, more particularly, to breakaway mounting of a flashlight or the like to a helmet or the like.

BACKGROUND

Snag hazards occur in a variety of situations. Entanglement of foreign objects with hardware or the like worn or carried by an individual can present dangers. Examples include fishing lines underwater, various lines or wires above ground, and various lines or wires in the air. Safety can be improved by implementing effective ways to avoid or eliminate any entanglement with such snag hazard objects.

SUMMARY

Embodiments of the present invention are directed to apparatuses and methods for mounting a piece of hardware to an object and providing a magnetic connection between them having a prescribed magnetic breakaway strength to allow them to separate at a breakaway strength, for instance, to avoid entanglement with snag hazard objects.

In accordance with an aspect, an apparatus for mounting hardware to an object comprises: a base member having an attachment surface to be attached to the object, a plurality of base member magnets, and a base breakaway connection surface; a hardware support having a hardware support surface to receive the hardware, a plurality of hardware support magnets, and a support breakaway connection surface to be magnetically coupled with the base breakaway connection surface of the base member, by magnetic attraction between the base member magnets and the hardware support magnets, to form a magnetic connection having a preset magnetic breakaway strength to maintain the magnetic connection between the hardware support and the base member and to allow the hardware support and the base member to be separated by a force greater than the preset magnetic breakaway strength; and a fastener to fasten the hardware to the hardware support, the fastener keeping the hardware and the hardware support fastened together under a force sufficiently large to separate the magnetic connection.

In accordance with another aspect, a method for mounting hardware to an object comprises: attaching an attachment surface of a base member to the object, the base member including a plurality of base member magnets and a base breakaway connection surface; fastening the hardware to a hardware support having a hardware support surface to receive the hardware, a plurality of hardware support magnets, and a support breakaway connection surface to be magnetically coupled with the base breakaway connection surface of the base member; and coupling the support breakaway connection surface of the hardware support with the base breakaway connection surface of the base member, by magnetic attraction between the base member magnets and the hardware support magnets, to form a magnetic connection which has a preset magnetic breakaway strength to maintain the magnetic connection between the hardware support and the base member and to allow the hardware support and the base member to be separated by a force greater than the preset magnetic breakaway strength. The fastener keeps the hardware and the hardware support fastened together under a force sufficiently large to separate the magnetic connection.

In accordance with yet another aspect, an apparatus for mounting hardware to an object comprises: a base member having an attachment surface to be attached to the object and a base breakaway connection surface; a hardware support having a hardware support surface to receive the hardware and a support breakaway connection surface; a fastener to fasten the hardware to the hardware support; and primary means for connecting the base breakaway connection surface of the base member and the support breakaway connection surface of the hardware support to form a primary breakaway connection which has a preset breakaway strength to maintain the primary breakaway connection between the hardware support and the base member and to allow the hardware support and the base member to be separated by a force greater than the preset breakaway strength and which is capable of reconnecting the hardware support and the base member to form the primary breakaway connection after being separated. The fastener keeps the hardware and the hardware support fastened together under a force sufficiently large to separate the primary breakaway connection.

BRIEF DESCRIPTION OF THE DRAWINGS

The attached drawings help explain the embodiments described below.

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

Figure 1:
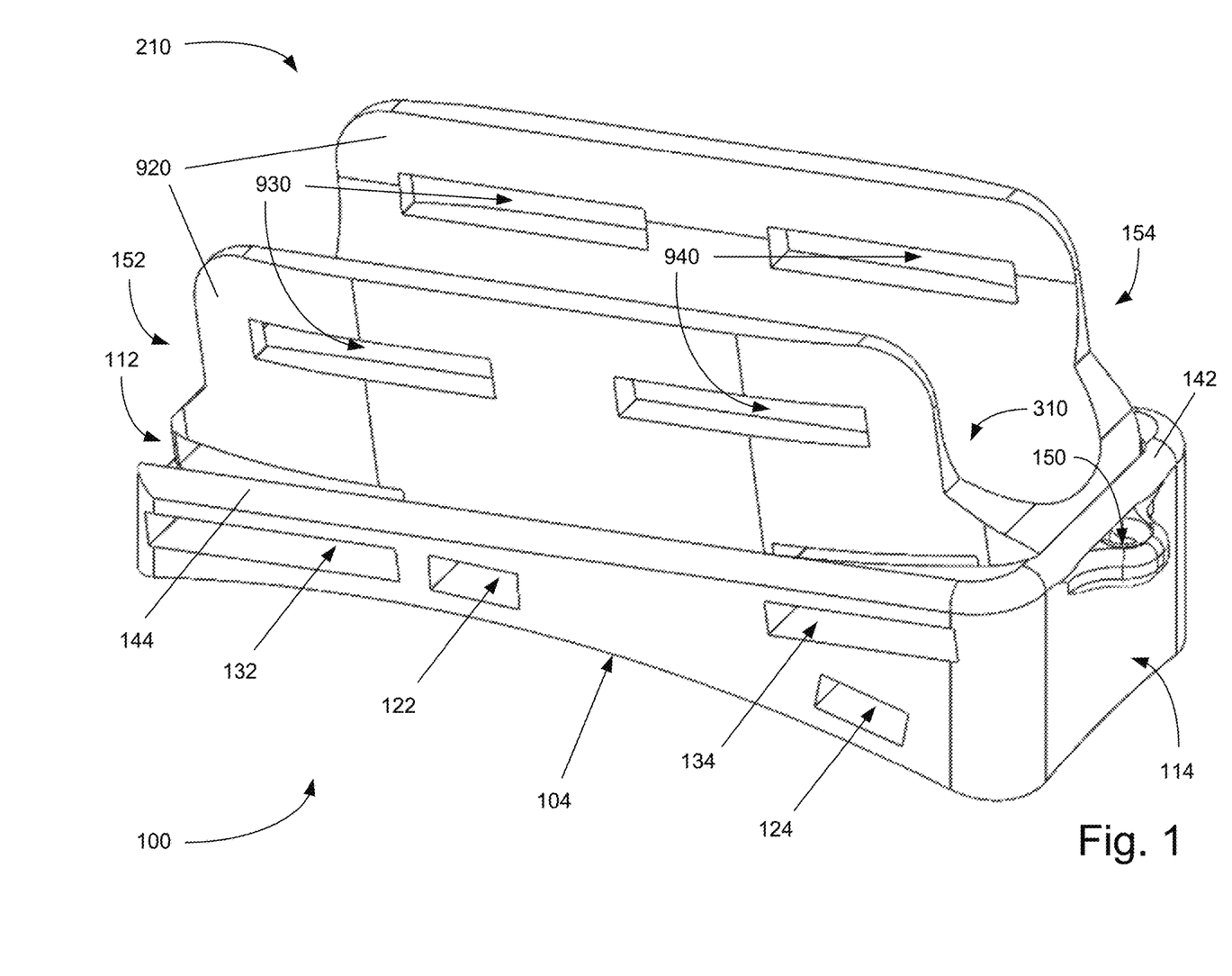
FIG. 1 is a perspective view illustrating an example of an assembly which includes a base member serving as an object mount to an object and a hardware support connected to the base member by support breakaway connection that separates at a prescribed breakaway strength.
Figure 2:
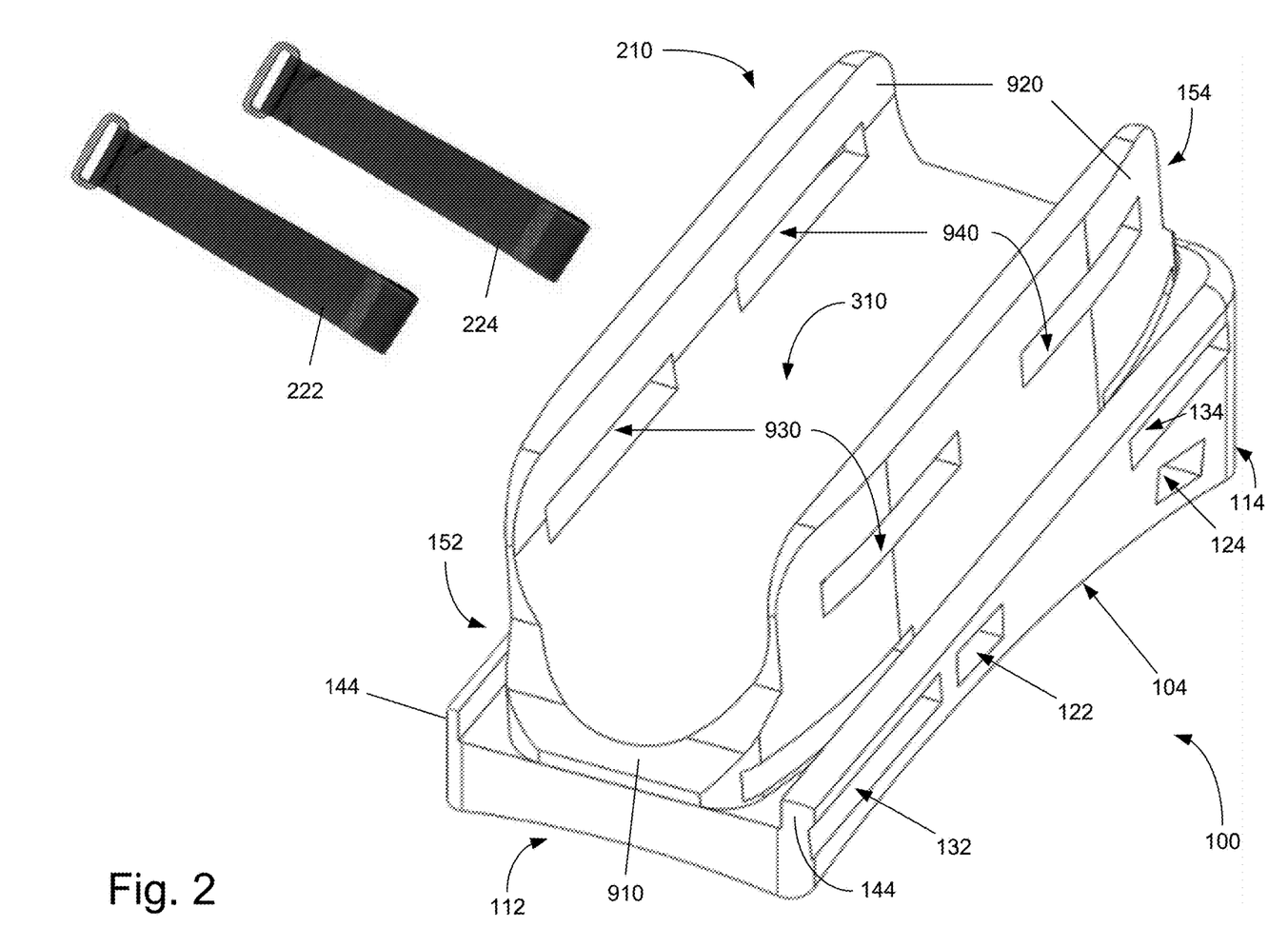
FIG. 2 is another perspective view of the assembly of FIG. 1 illustrating a fastening strap for the hardware support according to an embodiment.
Figure 3:
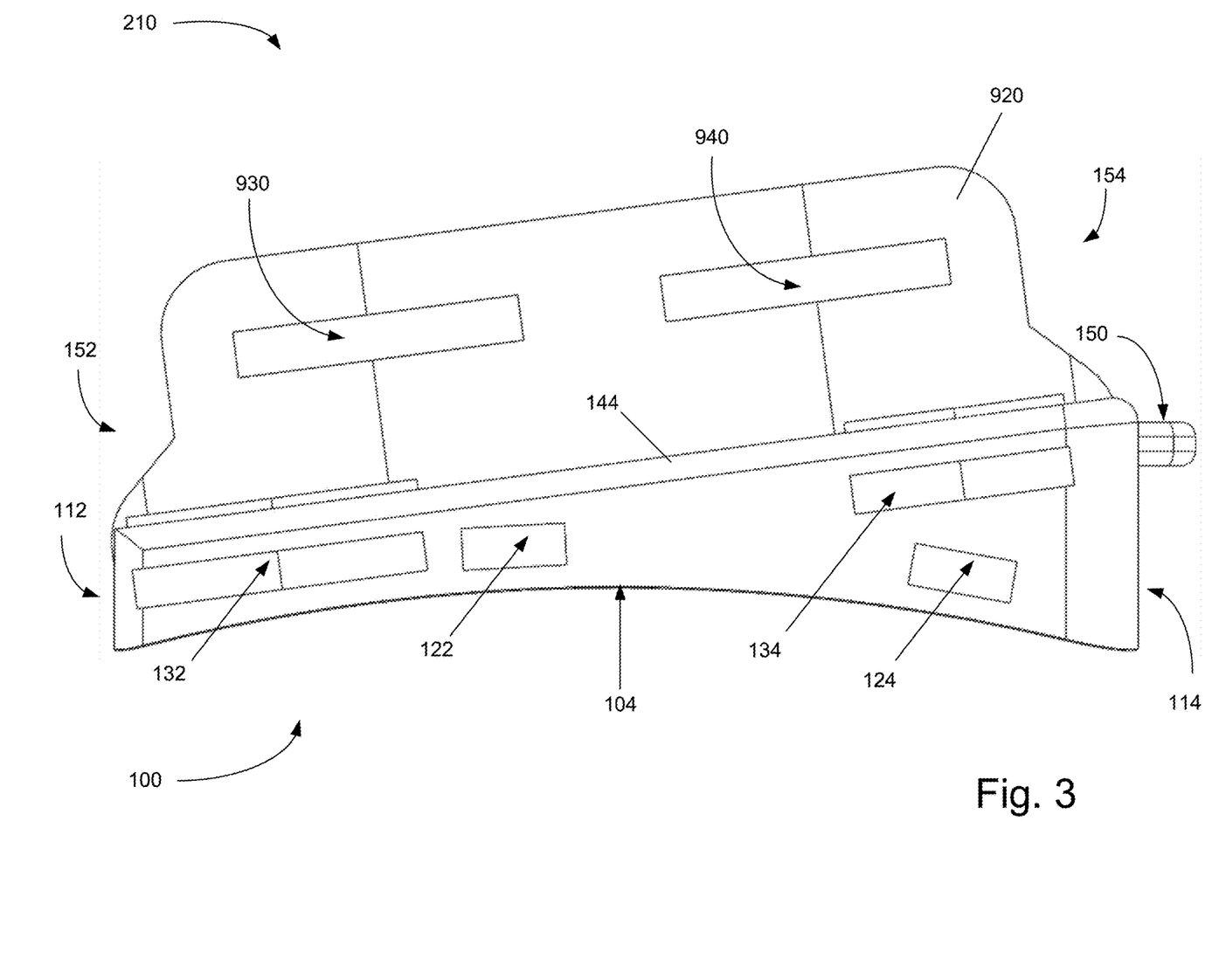
FIG. 3 is a side elevational view of the assembly of FIG. 1.

FIG. 1 is a perspective view illustrating an example of an assembly which includes a base member 100 serving as an object mount to an object (e.g., hard hat or helmet) and a hardware support 210 connected to the base member 100 by a support breakaway connection that separates at a prescribed breakaway strength. FIG. 2 is another perspective view of the assembly of FIG. 1 illustrating fastening straps 222, 224 for fastening a piece of hardware (e.g., flashlight) to the hardware support 210 according to an embodiment. FIG. 3 is a side elevational view of the assembly.

Figure 4:
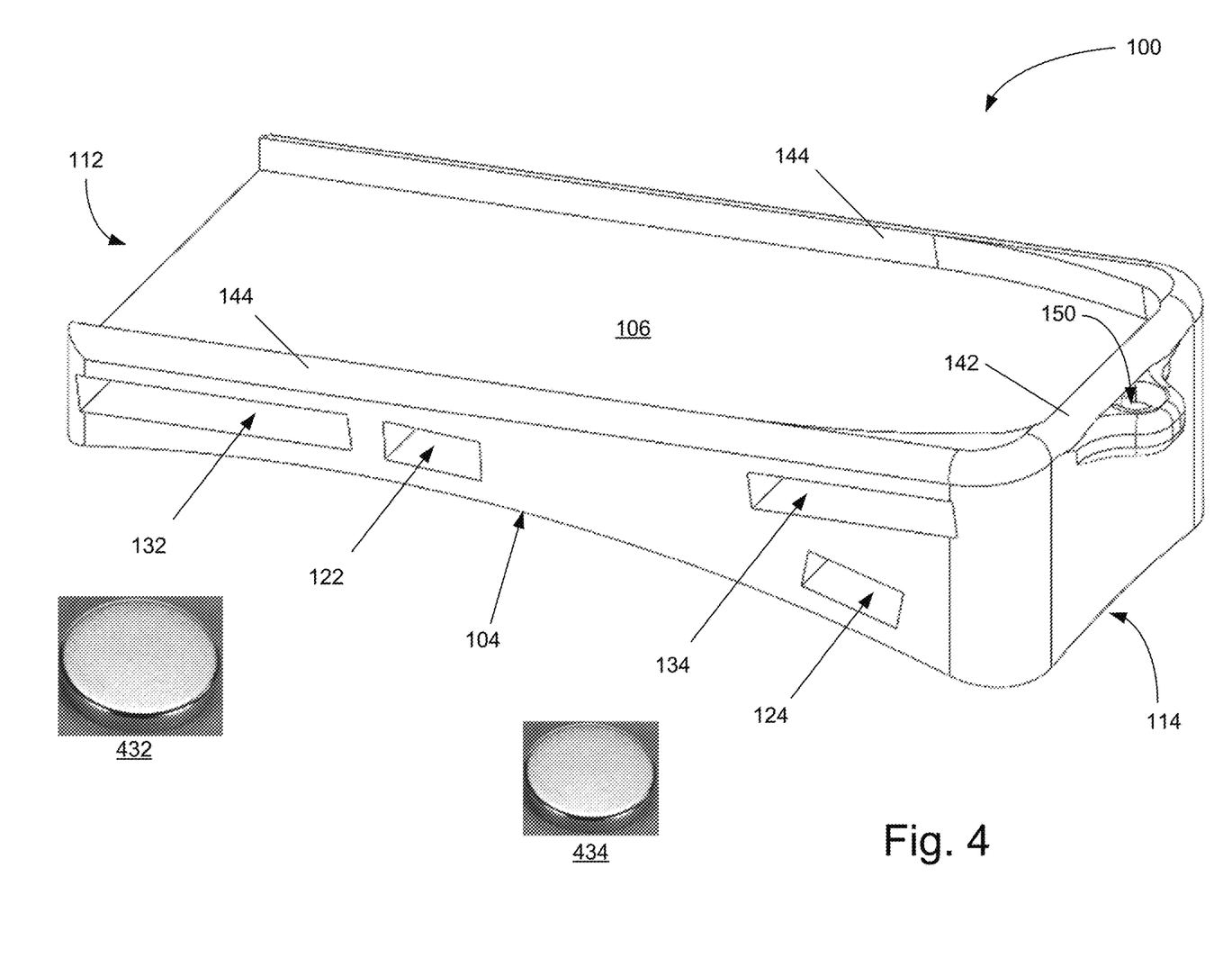
FIG. 4 is a perspective view of the base member of FIG. 1 illustrating placement of magnets according to an embodiment.
Figure 5:
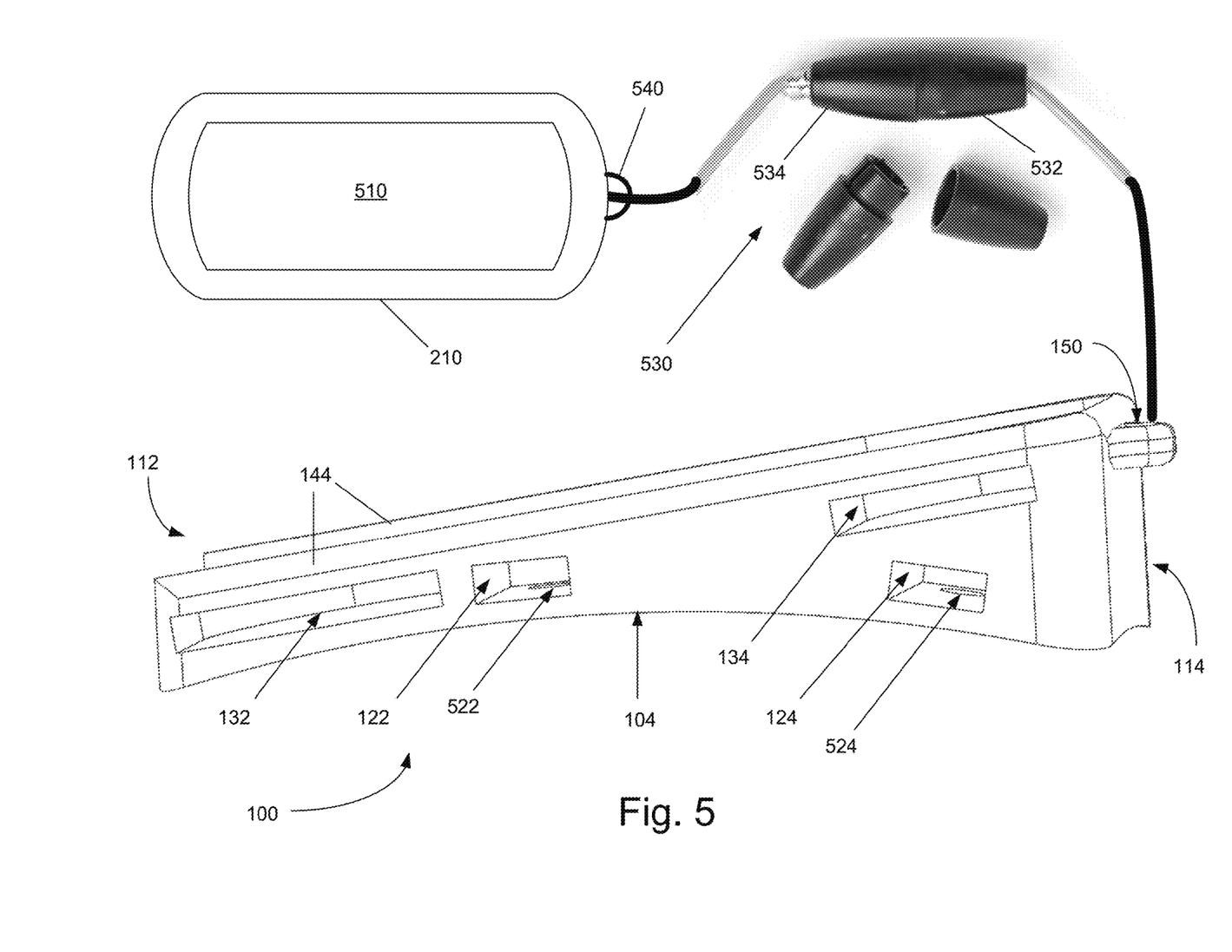
FIG. 5 shows an example of a piece of hardware coupled to the hardware support which is further connected to the base member of FIG. 4 via a secondary breakaway connection according to an embodiment.
Figure 6:
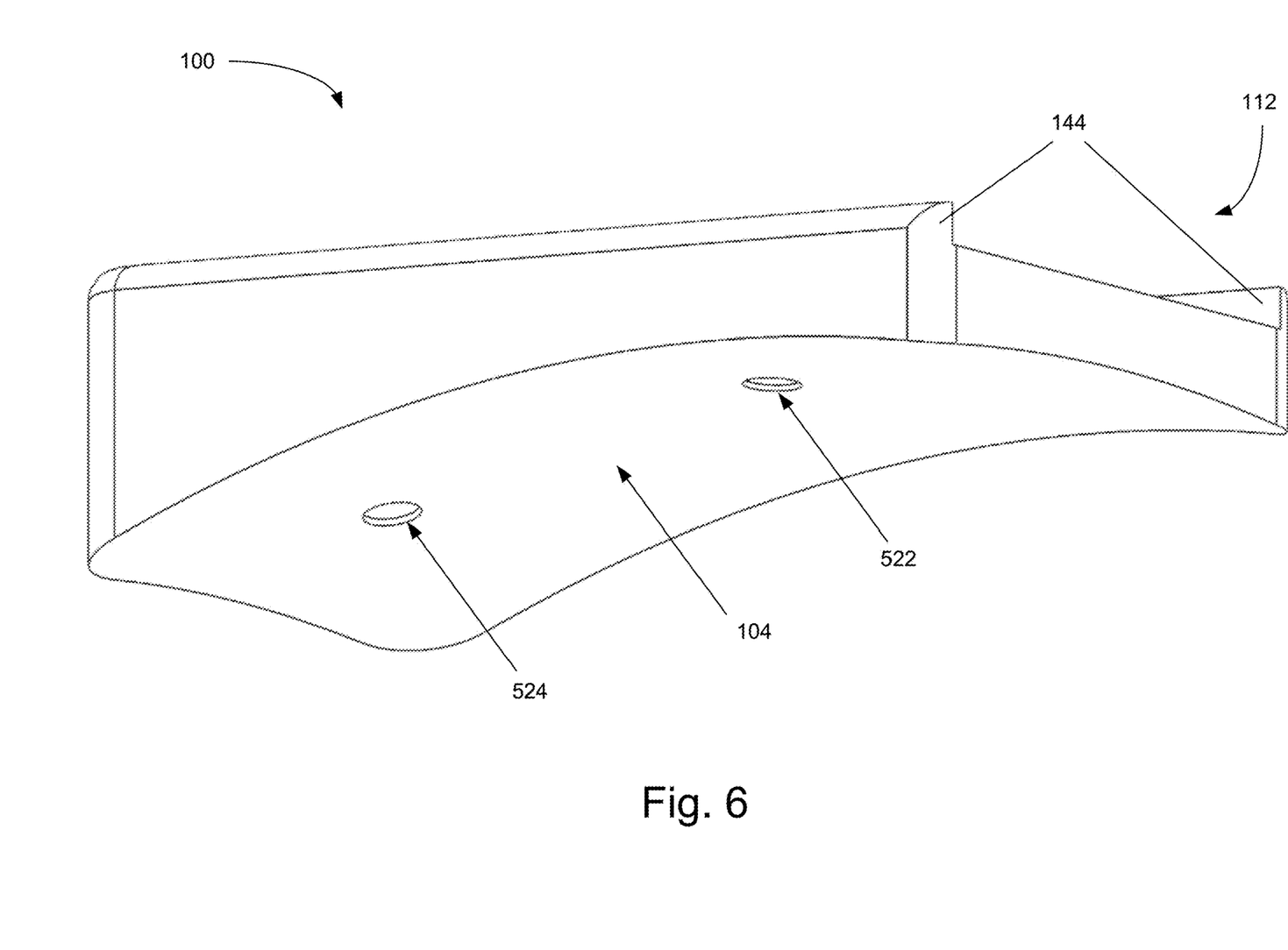
FIG. 6 is another perspective view of the base member of FIG. 4.
Figure 7:
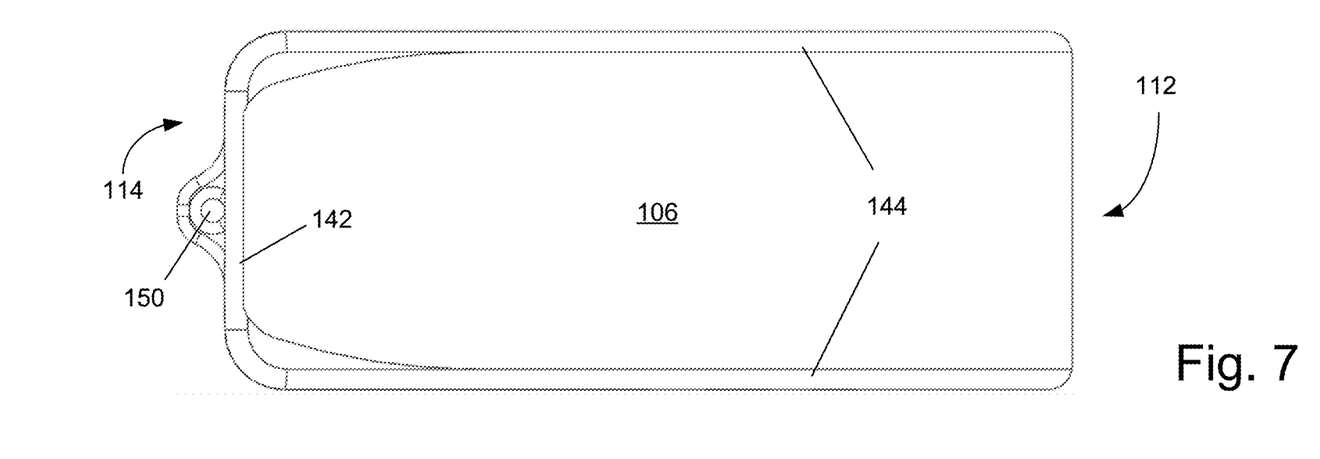
FIG. 7 is a top plan view of the base member of FIG. 4.
Figure 8:
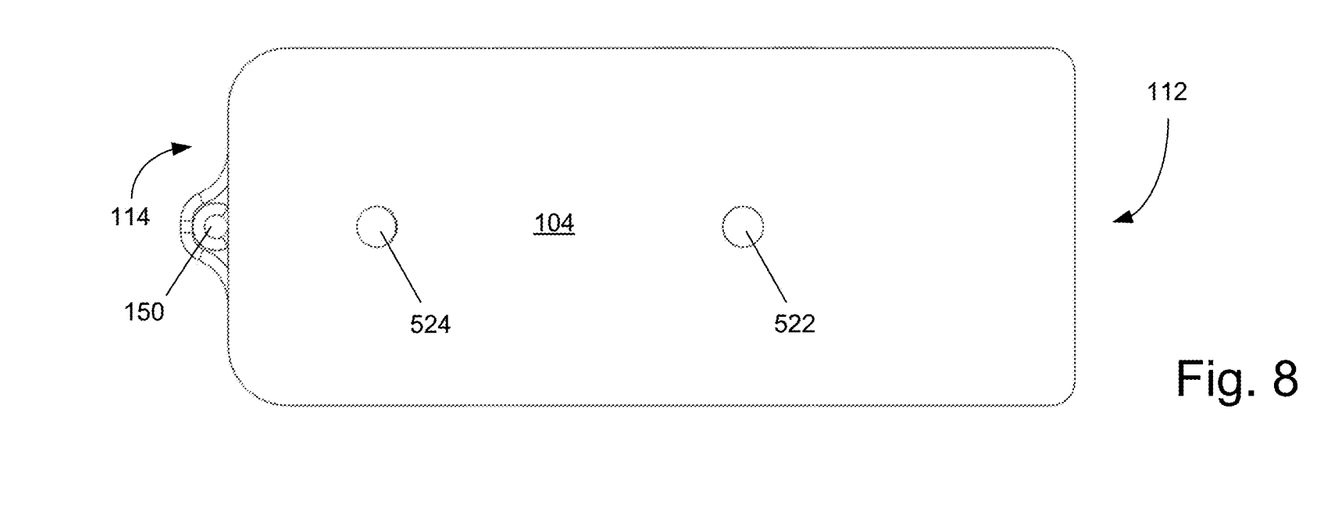
FIG. 8 is a bottom view of the base member of FIG. 4.

FIG. 4 is a perspective view of the base member 100 of FIG. 1 illustrating placement of front and back base member magnets 432, 434 according to an embodiment. FIG. 5 shows an example of a piece of hardware 510 coupled to the hardware support 210 which is further connected to the base member 100 of FIG. 4 via a secondary breakaway connection 530 according to an embodiment. FIG. 6 is another perspective view of the base member 100 showing features of an attachment surface 104 for attaching to the object. FIG. 7 is a top plan view of the base member 100. FIG. 8 is a bottom view of the base member 100.

The base member or base adapter 100 has the attachment surface 104 to be attached to the object such as a helmet or hardhat. The attachment surface 104 may have a complementary shape (e.g., curved concave) that conforms to the shape of the outer surface of the object (e.g., curved convex). In this example, the attachment surface 104 has a curved concave surface.

A base breakaway connection surface 106 provides an attachment surface for attaching the hardware assembly of the piece of hardware 510 and the hardware support 210. The base breakaway connection surface 106 may be flat or substantially flat to provide a low profile or footprint with respect to the attachment surface 104 for mounting the hardware assembly. The base member 100 has a front end 112 and a back end 114. The front end 112 and back end 114 may have the same thickness or height or they may have different thicknesses or heights. In the example shown, the back end 114 has a larger thickness than the front end 112 to create a downward incline for aiming the hardware, for instance, by several degrees. In a specific embodiment involving a helmet as the object, the front end 112 is approximately 0.41" tall and the back end 114 is about 0.85" tall, creating a 7° angle allowing the flashlight beam to be aimed slightly downwardly from the top of the wearer's head to illuminate an area generally in front of the wearer's field of sight or field of vision.

The base member 100 may be attached to the object such as a helmet using any suitable mechanism including fasteners or adhesives. In the embodiment as best seen in FIG. 5, the base member 100 has two fastener slots or cavities 122, 124 whereby fasteners such as screws or bolts are inserted through predrilled holes of the object and through predrilled holes 522, 524 the attachment surface 104 into the slots 122, 124, respectively, and are tightened with nuts or the like. In a specific embodiment, the slots 122, 124 are each of a prescribed width, acting as a wrench or socket to prevent the nut inside from turning. For each slot, there may be a set of a nut, a screw, a washer, and a locking washer. The predrilled holes 522, 524 may be provided at the attachment surface 104 of the base member 100 and may be centered on the slots 122, 124 to be concentric with the threads of the nut as well as centered on a centerline of the base member 100 extending from the front end 112 to the back end 114.

The base member 100 may include a plurality of base member magnets. In one embodiment as best seen in FIG. 4, the base member 100 has two magnet cavities, including a front base member magnet cavity 132 and a back base member magnet cavity 134 to receive front and back base member magnets 432, 434, respectively, spaced in a direction between the front end 112 and the back end 114 of the base member 100. The front and back base member magnets 432, 434 may be disposed along the centerline of the base member 100 extending from the front end 112 to the back end 114. In the embodiment shown, the magnet cavities 132, 134 may be open cavities and the base member magnets therein may be sealed with a sealing material such as waterproof silicone sealant. The base member 100 may be made of plastic such as hard plastic. A hard material that is not deformable (unlike soft rubber or the like) for the base member 100 typically renders the mounting of the hardware to the object more rigid and stable. In other embodiments, the base member 100 may include more than two base member magnet cavities for receiving more than two base member magnets.

As seen in FIGS. 4-7, a guide of the base member 100 may extend upward along the side edge of the base breakaway connection surface 106. In the example shown, the guide has a back guide portion or back guide member 142 extending along a back edge of the back end 114 and two side guide portions or side guide members 144 extending along two side edges between the front end 112 and the back end 114. The two side guide portions 144 guide the hardware support 210 from the front end 112 toward the back end 114 and the back guide portion 142 serves as a back end stop for the hardware support 210.

As best seen in FIG. 5, the base member 100 may include a base member secondary attachment 150 for attaching a base member secondary breakaway connector 532 to make a secondary breakaway connection or retention 530 with the hardware support 210. The hardware support 210 may include a hardware support secondary attachment 540 (e.g., attachment opening similar to 150 on the base member 100) for attaching a hardware support secondary breakaway connector 534 for mating with the base member secondary breakaway connector 532 to make the secondary breakaway connection 530 with the base member 100. The secondary breakaway connection 530 may be a mechanical connection and may form a breakaway safety lanyard for the hardware support 210. In one example, the secondary breakaway resistance is about 8-12 pounds or about 10 pounds. The secondary breakaway connection 530 is provided for redundancy in connecting the hardware 510 to the object 200 and it also separates to eliminate entanglement when the secondary breakaway resistance is reached. This is an example of a secondary mechanism or means for forming a secondary breakaway connection 530 between the hardware support 210 and the base member 100. The secondary breakaway connection 530 (e.g., mechanism, electronic, etc. not utilizing magnets) may be of a different type from the primary breakaway connection (e.g., magnetic).

Figure 9:
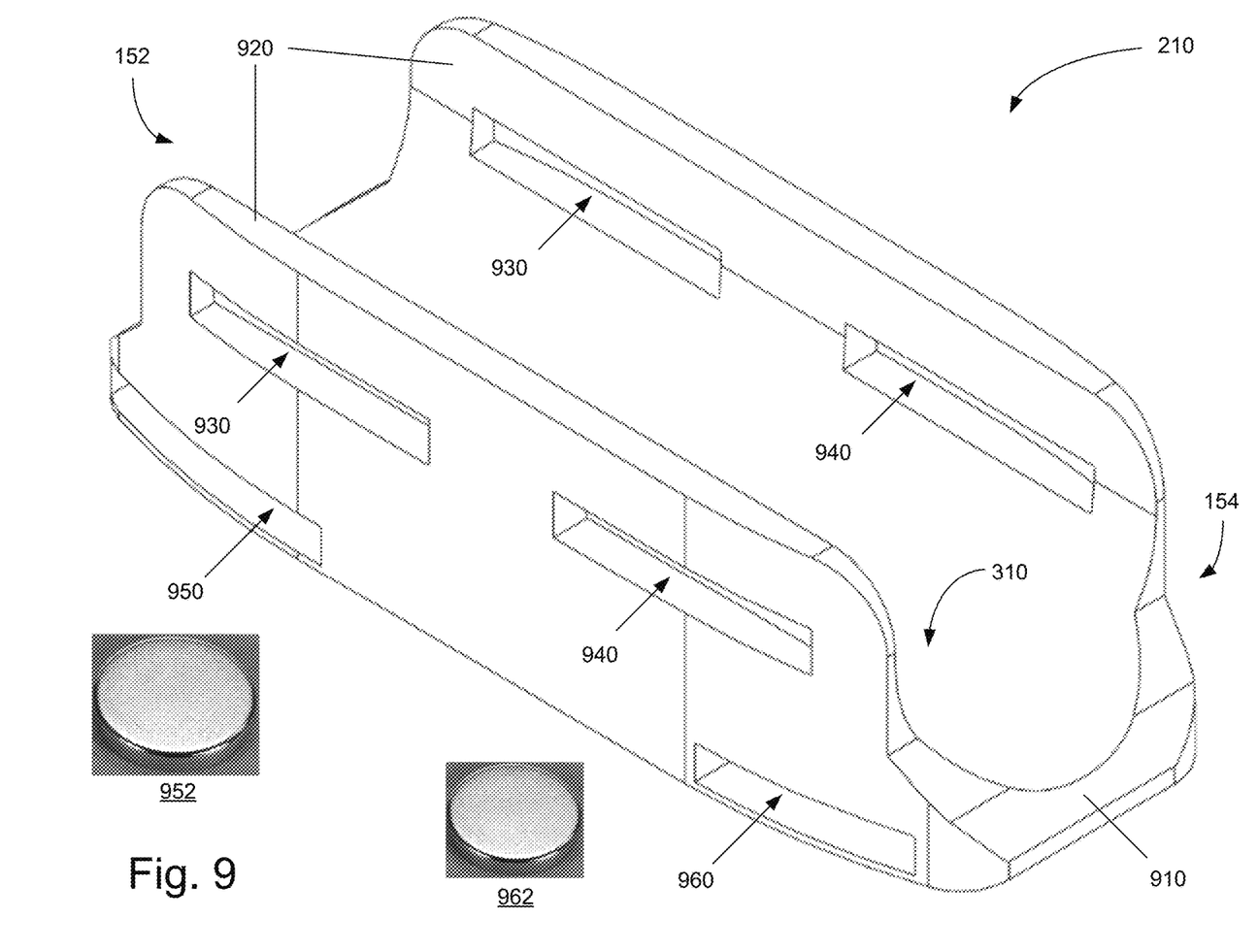
FIG. 9 is a perspective view of the hardware support of FIG. 1.
Figure 10:
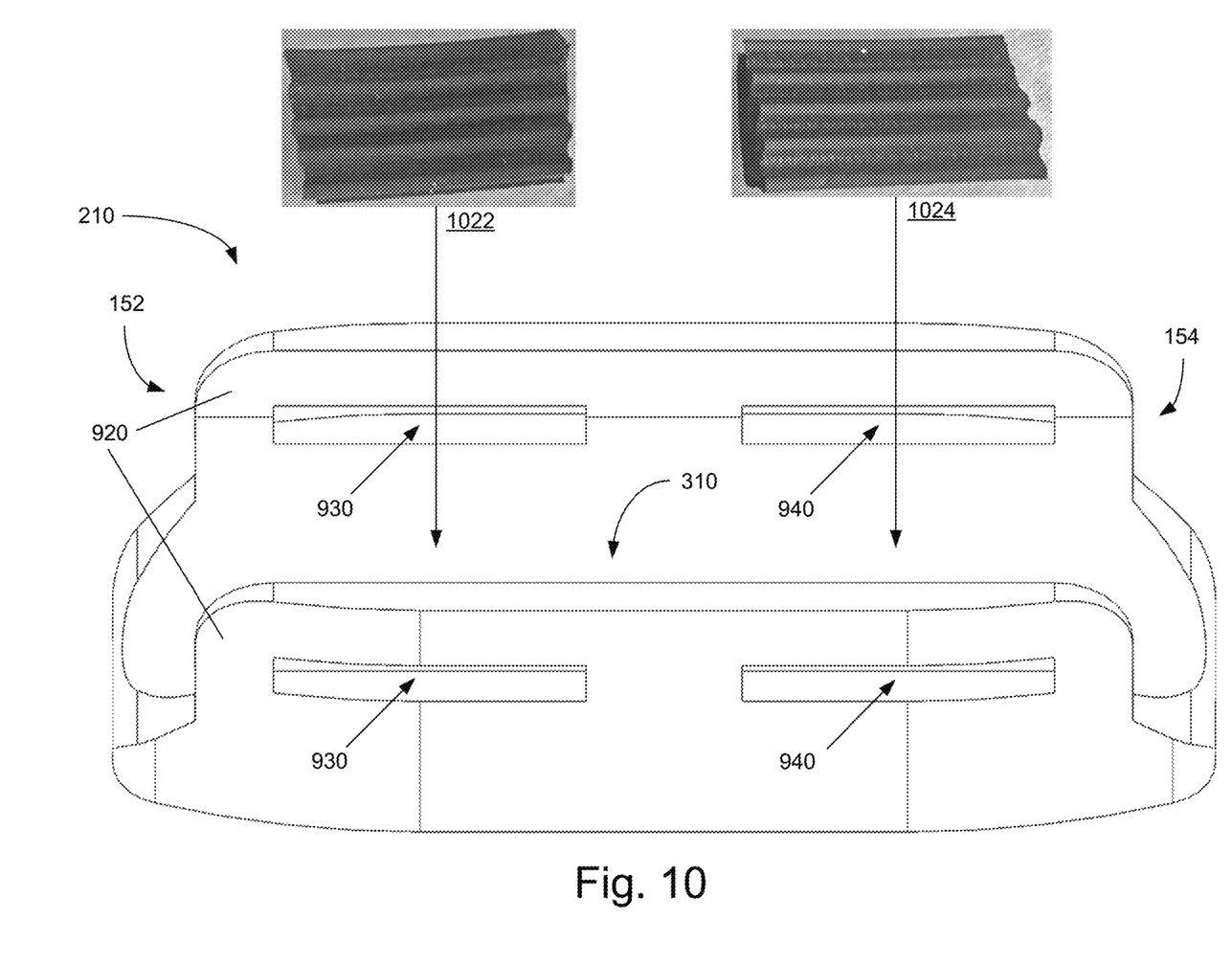
FIG. 10 is another perspective view of the hardware support of FIG. 9 illustrating placement of contact feet on the hardware support according to an embodiment.
Figure 11:
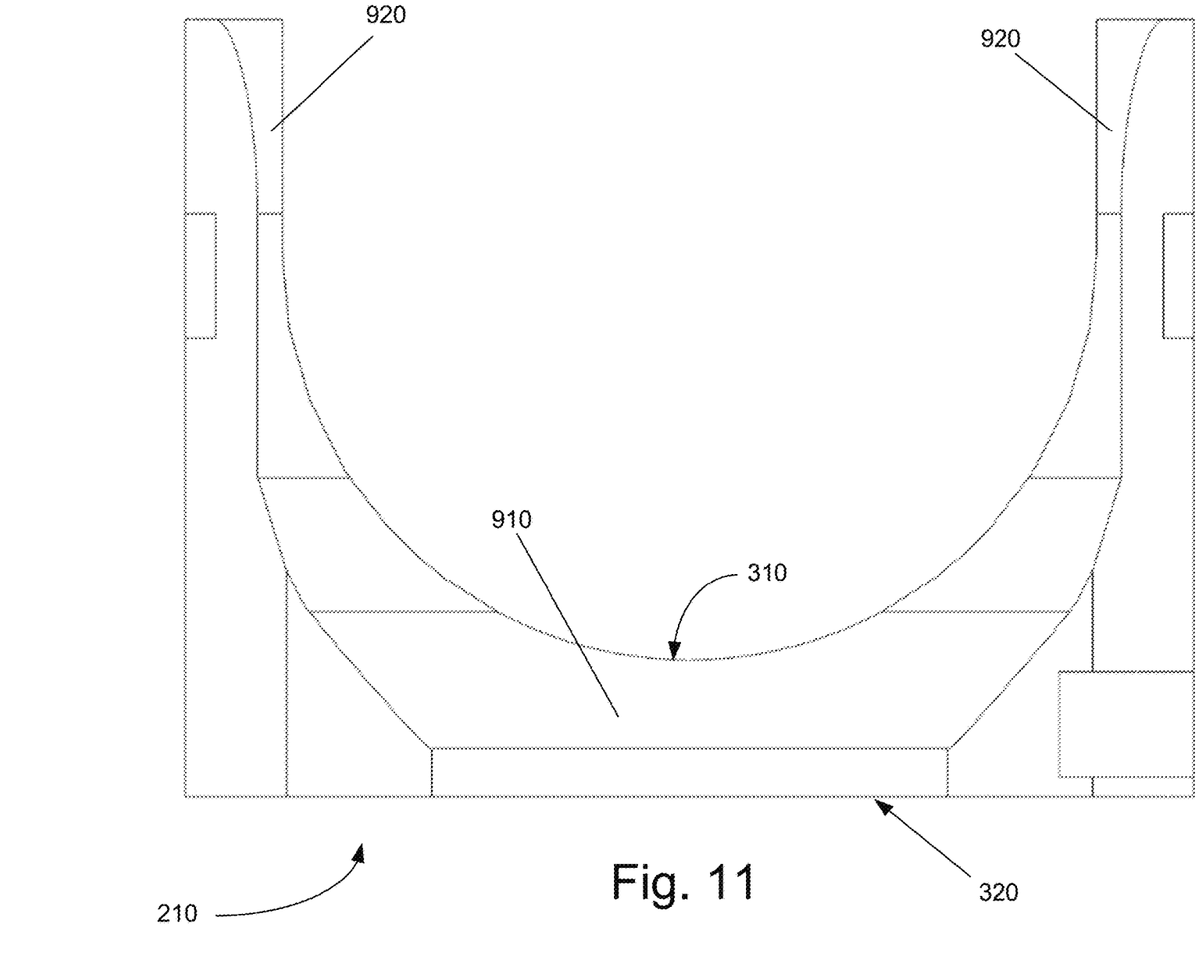
FIG. 11 is a front elevational view of the hardware support of FIG. 9.

FIG. 9 is a perspective view of the hardware support 210 of FIG. 1 illustrating placement of hardware support magnets 952, 962. FIG. 10 is another perspective view of the hardware support 210 of FIG. 9 illustrating placement of contact feet 1022, 1024 on the hardware support 210 according to an embodiment. FIG. 11 is a front elevational view of the hardware support 210 of FIG. 9.

The hardware support 210 may include a base 910 and side members 920 and serves as a cradle for holding the hardware 510 such as a flashlight. The hardware support 210 has a support breakaway connection surface 320 configured to be connected to the base breakaway connection surface 106 of the base member 100. This breakaway connection is the primary mechanism or means for connecting the base breakaway connection surface 106 of the base member 100 and the support breakaway connection surface 320 of the hardware support 210 to form a primary breakaway connection. It has a preset breakaway strength to maintain the magnetic connection between the hardware support 210 and the base member 100 and to allow the hardware support 210 and the base member 100 to be separated by a force greater than the preset breakaway strength and is capable of reconnecting with the hardware support 210 and the base member 100 to form the primary breakaway connection after being separated.

The hardware support 210 has the hardware support surface 310 to receive the hardware 510. The hardware support surface 310 may generally be concave or have a concave portion to partially wrap around the hardware 510 such as a flashlight. A fastener may be used to fasten the hardware 510 to the hardware support 210. In one example as best seen in FIG. 2, front fastening strap 222 and back fastening strap 224 are provided as the fastener, in conjunction with the hardware support surface 310, to wrap around and secure the hardware 510. The front fastening strap 222 may pass through front attachment openings 930 in the side members 920. Alternatively, two front fastening straps may pass through the two front attachment openings 930 separately and be connected to one another to fasten the front portion of the hardware. Similarly, the back fastening strap 224 may pass through back attachment openings 940 in the side members 920. Alternatively, two back fastening straps may pass through the two back attachment openings 940 separately and be connected to one another to fasten the back portion of the hardware. The side members 920 may be rigid. Alternatively, they may be at least slightly flexible or resilient to provide better contact with the hardware when the fastening straps 222, 224 are tightened to wrap around the hardware.

The hardware support 210 includes the support breakaway connection surface 320 to be coupled with the base breakaway connection surface 106 of the base member 100, for instance, by magnetic attraction between the base member magnets and hardware support magnets. They form a magnetic connection having a preset magnetic breakaway strength to maintain the magnetic connection between the hardware support 210 and the base member 100 and to allow the hardware support 210 and the base member 100 to be separated by a force greater than the preset magnetic breakaway strength. The fastener (e.g., fastening straps 222, 224) keeps the hardware 510 and the hardware support 210 together under a force sufficiently large to separate the magnetic connection but not enough to separate the hardware 510 from the hardware support 210.

As seen in FIG. 9, the hardware support 210 may include hardware support magnets. In this example, the hardware support 210 includes a front hardware support magnet cavity 950 at a front interior magnet location for receiving a front hardware support magnet 952 and a back hardware support magnet cavity 960 at a back interior magnet location for receiving a back hardware support magnet 962. The front and back hardware support magnets 952, 962 may be spaced in a direction between the front end 152 and the back end 154 of the hardware support 210. The front and back hardware support magnets 952, 962 may be disposed along a centerline of the hardware support 210 extending from the front end 152 to the back end 154. The front and back hardware support magnet cavities 950, 960 may be open cavities and the hardware support magnets therein may be sealed with a sealing material such as waterproof silicone sealant.

To mount the hardware 510 to the object 200, the user may slide the hardware support 210 on the base breakaway connection surface 106 from the open front edge of the front end 112 of the base member 100, between the two side guide portions 144 toward the back guide portion 142 at the back end 114 of the base member 100 into position, guided by the two side guide portions 144, until the magnetic attachment is made, as seen in FIGS. 1-3. This occurs when the front base member magnet 432 and the front hardware support magnet 952 are aligned and the back base member magnet 434 and the back hardware support magnet 962 are aligned to form the magnetic connection between the base member 100 and the hardware support 210. The side guide portions or side guide members 144 provide a tactile guide (similar to a shotgun slide) for receiving the support breakaway connection surface 320 of the hardware support 210 into position on the base breakaway connection surface 106. This is useful and convenient especially when the magnetic connection to be made is disposed in a way that is difficult or impossible for the user to see visually, for instance, above the user's head on a helmet or hardhat.

As seen in FIG. 10, a front foot 1022 and a back foot 1024 may be disposed on the hardware support surface 310 to provide increased surface contact and friction with the outer surface of the hardware 510 to produce a firmer grip on the hardware 510 when the fastening straps 222 and 224 are tightened around the hardware 510. The feet 1022, 1024 may be compressible members made of a deformable material such as compressible rubber, foam, or sponge rubber. They may or may not be affixed to the hardware support surface 310 (e.g., using adhesive or the like). If not affixed, the feet 1022, 1024 may be held in place by the compression between the hardware 510 and the hardware support 210. In one example, the feet 1022, 1024 may include undulating ridges along the direction between the front and back. In other examples, the feet 1022, 1024 may include textured surfaces that provide, when compressed under compression, improved/increased surface contact and friction with the hardware 510. The feet 1022, 1024 are an example of a mechanism or contact means disposed on the hardware support surface 310 for providing increased surface contact and friction with the hardware 510.

The shape of the outer surface of the hardware 510 does not perfectly match the shape of the hardware support surface 310, but the shapes may be generally complementary. In an example, a diameter of the hardware such as the barrel of a flashlight and the curve of the hardware support surface 310 may be generally concentric. The straps 222, 224 may be used to secure the flashlight and primarily prevent it from moving longitudinally. The feet 1022, 1024 may be configured to create friction and primarily keep the flashlight 510 from moving laterally. The combination of the longitudinal restraint and lateral restraint provided by the hardware support 210 is provided to "hug" the barrel of the flashlight 510 and keep it in place.

Figure 12:
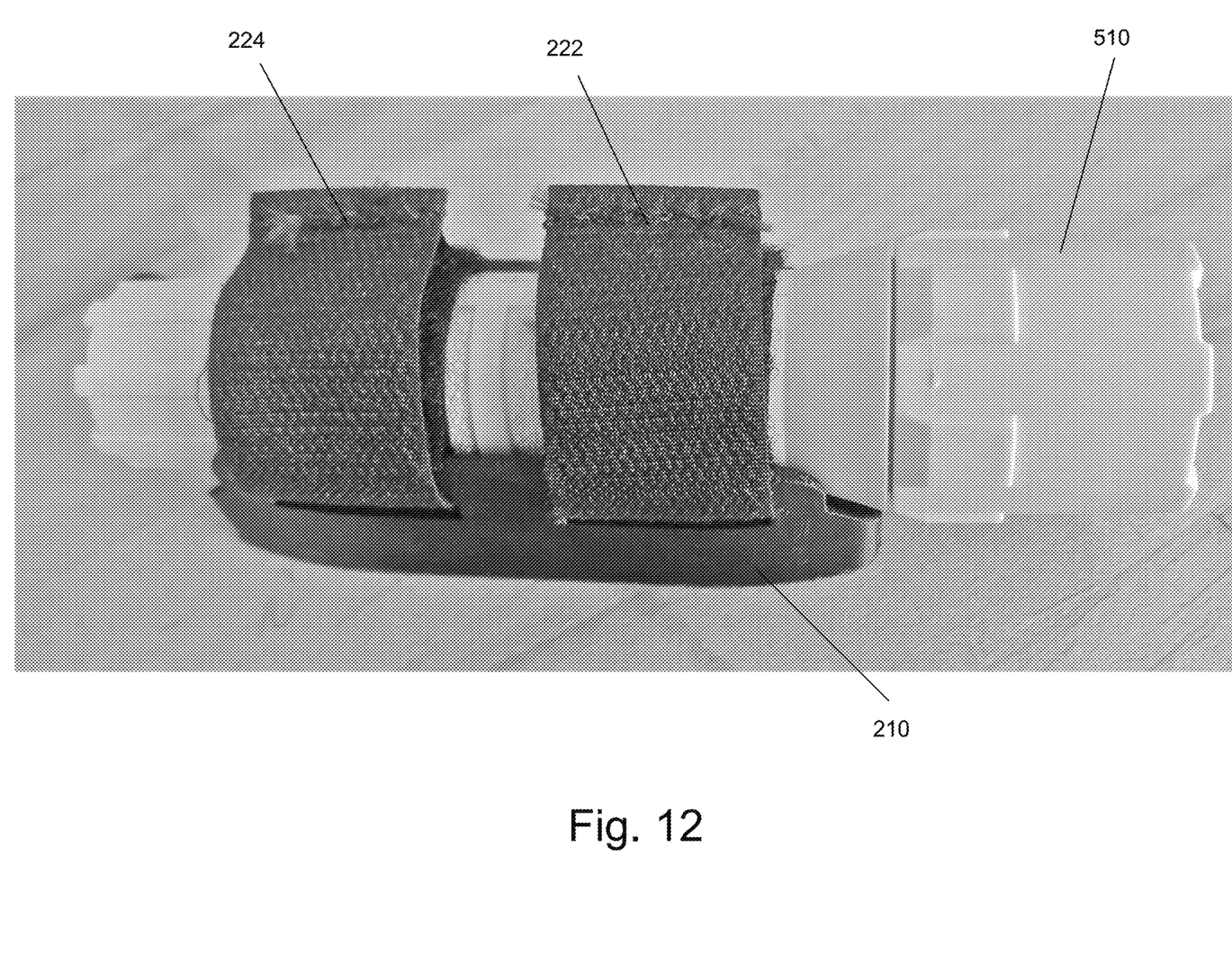
FIG. 12 shows an example of a piece of hardware in the form of a flashlight which is connected to the hardware support and fastened with fastening straps.

FIG. 12 shows an example of a piece of hardware in the form of a flashlight 510 which is connected to the hardware support 210 and fastened with the front and back fastening straps 222, 224. The fastening straps 222, 224 may be Velcro straps which are convenient, effective, and easy to use. The flashlight 510 may be about 1 inch in diameter in one example. The front base member magnet 432 in the front base member magnet cavity 132 of the base member 100 is in magnetic attachment with the front hardware support magnet 952 in the front hardware support magnet cavity 950 at the front hardware support magnet location of the hardware support 210. The back base member magnet 434 in the back base member magnet cavity 134 is in magnetic attachment with the back hardware support magnet 962 in the back hardware support magnet cavity 960 at the back hardware support magnet location of the hardware support 210.

The magnets may be selected to have polarities that will prevent the front hardware support magnet of the hardware support 210 from forming a magnetic attachment with the back base member magnet of the base member 100 and prevent the back hardware support magnet of the hardware support 210 from forming a magnetic attachment with the front base member magnet of the base member 100. It precludes the possibility of a magnetic connection between the base member 100 and the hardware support 210 in which the front base member magnet and the back hardware support member are aligned and the back base member magnet and the front hardware support magnet are aligned. This ensures the proper orientation of the flashlight 510 and prevents backward mounting of the flashlight 510. This polarities feature of a magnetic connection is an example of a mechanism or means for allowing the primary breakaway connection to be formed between the base member 100 and the hardware support 210 when the hardware support 210 is positioned with the front end 152 oriented in the same front direction as the front end 112 of the base member 100 and with the back end 154 oriented in the same back direction as the back end 114 of the base member 100, and preventing the primary breakaway connection to be formed between the base member 100 and the hardware support 210 when the hardware support 210 is positioned with the front end 152 oriented in a different direction from the front end 112 of the base member 100 or with the back end 154 oriented in a different direction from the back end 114 of the base member 100.

If sliding the support breakaway connection surface 320 of the hardware support 210 on the base breakaway connection surface 106 of the base member 100, from the front end 112 toward the back end 114 of the base member 100, does not form a magnetic connection, the hardware support 210 can be turned around to switch position between the front end 112 and back end 114 of the hardware support 210 and the wearer can slide the support breakaway connection surface 320 of the hardware support 210 on the base breakaway connection surface 106 of the base member 100, from the front end 112 toward the back end 114 of the base member 100, until the front base member magnet and the front hardware support magnet are aligned and the back base member magnet and the back hardware support magnet are aligned to form the magnetic connection between the base member 100 and the hardware support 210.

The magnets are selected to provide breakaway strength for separating the magnetic attachment between the hardware support 210 and the base member 100. The breakaway resistance is predetermined by selecting magnets of particular strengths. In one embodiment, the magnets are selected to provide a perpendicular static pull of about 9 pounds and a perpendicular dynamic pull of about 17.5 pounds.

As seen in FIGS. 4 and 9, the front and back base member magnets 432, 434 and the front and back hardware support magnets 952, 962 may be disk magnets. In one example, the front magnets 432, 952 may each be a disk magnet of 1 inch in diameter (for the base member 100 and the hardware support 210) having a magnet to steel plate strength of 15.6 pounds. The values are the field values at the surface of the magnet, centered on the axis of magnetization. The back magnets 434, 962 may each be a disk magnet of 0.75 inch in diameter (for the base member 100 and the hardware support 210) having a magnet to steel plate strength of 12.08 pounds. The values are the field values at the surface of the magnet, centered on the axis of magnetization.

The inventive concepts taught by way of the examples discussed above are amenable to modification, rearrangement, and embodiment in several ways. For example, this invention may be applicable for mounting different hardware to different objects. The magnets may have different configurations and may be arranged in a variety of different ways. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. An apparatus for mounting hardware to an object, the apparatus comprising:
a base member having an attachment surface to be attached to the object, a plurality of base member magnets, and a base breakaway connection surface;
a hardware support having a hardware support surface to receive the hardware, a plurality of hardware support magnets, and a support breakaway connection surface to be magnetically coupled with the base breakaway connection surface of the base member, by magnetic attraction between the base member magnets and the hardware support magnets, to form a magnetic connection having a preset magnetic breakaway strength to maintain the magnetic connection between the hardware support and the base member and to allow the hardware support and the base member to be separated by a force greater than the preset magnetic breakaway strength; and
a fastener to fasten the hardware to the hardware support, the fastener keeping the hardware and the hardware support fastened together under a force sufficiently large to separate the magnetic connection.

2. The apparatus of claim 1,
wherein the base member comprises a guide on the base breakaway connection surface, the guide including two side guide portions extending between a front end and a back end of the base member to provide a tactile guide for receiving the support breakaway connection surface of the hardware support by sliding the support breakaway connection surface on the base breakaway connection surface from the front end to the back end of the base member into position, guided by the two side guide portions of the guide.

3. The apparatus of claim 2,
wherein the base member includes a front base member magnet and a back base member magnet spaced in a direction between the front end and the back end of the base member;
wherein the hardware support includes a front hardware support magnet and a back hardware support magnet spaced in a direction between a front end and a back end of the hardware support; and
wherein the front base member magnet and the front hardware support magnet are aligned and the back base member magnet and the back hardware support magnet are aligned to form the magnetic connection between the base member and the hardware support.

4. The apparatus of claim 3,
wherein the front base member magnet, the back base member magnet, the front hardware support magnet, and the back hardware support magnet are configured to prevent a magnetic connection between the base member and the hardware support in which the front base member magnet and the back hardware support magnet are aligned and the back base member magnet and the front hardware support magnet are aligned.

5. The apparatus of claim 1,
wherein the hardware support surface has a concave portion to partially wrap around the hardware.

6. The apparatus of claim 1,
wherein the hardware support surface includes a compressible member configured to be disposed between the hardware support surface and the hardware and having ridges to provide, under compression, increased surface contact and friction with the hardware.

7. The apparatus of claim 6,
wherein the fastener comprises a plurality of fastening straps extending across two sides of the hardware support surface to fasten the hardware to the hardware support, the fastening straps including a front fastening strap disposed between the compressible member and a front end of the hardware support and a back fastening strap disposed between the compressible member and a back end of the hardware support.

8. The apparatus of claim 1,
wherein the base member includes a base member secondary breakaway connector and the hardware support includes a hardware support secondary breakaway connector to make a secondary breakaway connection with the base member secondary breakaway connector.

9. A method for mounting hardware to an object, the method comprising:
attaching an attachment surface of a base member to the object, the base member including a plurality of base member magnets and a base breakaway connection surface;
fastening with a fastener the hardware to a hardware support having a hardware support surface to receive the hardware, a plurality of hardware support magnets, and a support breakaway connection surface to be magnetically coupled with the base breakaway connection surface of the base member; and
coupling the support breakaway connection surface of the hardware support with the base breakaway connection surface of the base member, by magnetic attraction between the base member magnets and the hardware support magnets, to form a magnetic connection which has a preset magnetic breakaway strength to maintain the magnetic connection between the hardware support and the base member and to allow the hardware support and the base member to be separated by a force greater than the preset magnetic breakaway strength;
the fastener keeping the hardware and the hardware support fastened together under a force sufficiently large to separate the magnetic connection.

10. The method of claim 9, further comprising:
sliding the support breakaway connection surface of the hardware support on the base breakaway connection surface of the base member, along a tactile guide provided by two side guide portions of a guide disposed on the base breakaway connection surface and extending between a front end and a back end of the base member, from the front end toward the back end of the base member into position, guided by the two side guide portions of the guide.

11. The method of claim 10,
wherein the base member includes a front base member magnet and a back base member magnet spaced in a direction between the front end and the back end of the base member;
wherein the hardware support includes a front hardware support magnet and a back hardware support magnet spaced in a direction between a front end and a back end of the hardware support; and
wherein the support breakaway connection surface of the hardware support is slid on the base breakaway connection surface of the base member, from the front end toward the back end of the base member, until the front base member magnet and the front hardware support magnet are aligned and the back base member magnet and the back hardware support magnet are aligned to form the magnetic connection between the base member and the hardware support.

12. The method of claim 11,
wherein the front base member magnet, the back base member magnet, the front hardware support magnet, and the back hardware support magnet are configured to prevent a magnetic connection between the base member and the hardware support in which the front base member magnet and the back hardware support magnet are aligned and the back base member magnet and the front hardware support magnet are aligned; and
wherein the method further comprises, if sliding the support breakaway connection surface of the hardware support on the base breakaway connection surface of the base member, from the front end toward the back end of the base member, does not form a magnetic connection, turning the hardware support around to switch position between a front end and a back end of the hardware support and sliding the support breakaway connection surface of the hardware support on the base breakaway connection surface of the base member, from the front end toward the back end of the base member, until the front base member magnet and the front hardware support magnet are aligned and the back base member magnet and the back hardware support magnet are aligned to form the magnetic connection between the base member and the hardware support.

13. The method of claim 9, further comprising:
pressing the hardware onto a compressible member on the hardware support surface, the compressible member having ridges to provide, under compression, increased surface contact and friction with the hardware.

14. The method of claim 13, wherein fastening the hardware to the hardware support comprises:
extending a plurality of fastening straps across two sides of the hardware support surface to fasten the hardware to the hardware support, the fastening straps including a front fastening strap disposed between the compressible member and a front end of the hardware support and a back fastening strap disposed between the compressible member and a back end of the hardware support.

15. The method of claim 9, further comprising:
forming a secondary breakaway connection between a base member secondary breakaway connector of the base member and a hardware support secondary breakaway connector of the hardware support.

16. An apparatus for mounting hardware to an object, the apparatus comprising:
a base member having an attachment surface to be attached to the object and a base breakaway connection surface;
a hardware support having a hardware support surface to receive the hardware and a support breakaway connection surface;
a fastener to fasten the hardware to the hardware support; and
primary means for connecting the base breakaway connection surface of the base member and the support breakaway connection surface of the hardware support to form a primary breakaway connection which has a preset breakaway strength to maintain the primary breakaway connection between the hardware support and the base member and to allow the hardware support and the base member to be separated by a force greater than the preset breakaway strength and which is capable of reconnecting the hardware support and the base member to form the primary breakaway connection after being separated,
the fastener keeping the hardware and the hardware support fastened together under a force sufficiently large to separate the primary breakaway connection.

17. The apparatus of claim 16,
wherein the base member comprises a guide on the base breakaway connection surface, the guide including two side guide portions extending between a front end and a back end of the base member to provide a tactile guide for receiving the support breakaway connection surface of the hardware support by sliding the support breakaway connection surface on the base breakaway connection surface from the front end to the back end of the base member into position, guided by the two side guide portions of the guide.

18. The apparatus of claim 17, further comprising:
means for allowing the primary breakaway connection to be formed between the base member and the hardware support when the hardware support is positioned with a front end oriented in a same front direction as the front end of the base member and with a back end oriented in a same back direction as the back end of the base member, and preventing the primary breakaway connection to be formed between the base member and the hardware support when the hardware support is positioned with the front end oriented in a different direction from the front end of the base member or with the back end oriented in a different direction from the back end of the base member.

19. The apparatus of claim 17, further comprising:
contact means disposed on the hardware support surface for providing increased surface contact and friction with the hardware,
wherein the fastener comprises a plurality of fastening straps extending across two sides of the hardware support surface to fasten the hardware to the hardware support, the fastening straps including a front fastening strap disposed between the contact means and a front end of the hardware support and a back fastening strap disposed between the contact means and a back end of the hardware support.

20. The apparatus of claim 17, further comprising:
secondary means for forming a secondary breakaway connection between the hardware support and the base member, the secondary breakaway connection being of a different type from the primary breakaway connection.

* * * * *